United States Patent
Szczepanski

(10) Patent No.: US 10,605,205 B1
(45) Date of Patent: Mar. 31, 2020

(54) EXTERNAL IDLE AIR BYPASS FOR CARBURETED ENGINES

(71) Applicant: Peter G. Szczepanski, Glendora, CA (US)

(72) Inventor: Peter G. Szczepanski, Glendora, CA (US)

(*) Notice: Subject to any disclaimer, the term of this patent is extended or adjusted under 35 U.S.C. 154(b) by 167 days.

(21) Appl. No.: 15/721,911

(22) Filed: Oct. 1, 2017

(51) Int. Cl.
*F02M 3/08* (2006.01)
*F02M 17/04* (2006.01)

(52) U.S. Cl.
CPC .............. *F02M 3/08* (2013.01); *F02M 17/04* (2013.01)

(58) Field of Classification Search
CPC .................................. F02M 3/08; F02M 17/04
See application file for complete search history.

(56) References Cited

U.S. PATENT DOCUMENTS

| | | | | |
|---|---|---|---|---|
| 2,213,917 A * | 9/1940 | Leibing | ..................... | F02M 3/00 123/326 |
| 4,438,049 A * | 3/1984 | Ammons | ................ | F02M 3/075 123/339.1 |
| 4,508,068 A * | 4/1985 | Tuggle | ..................... | F02B 63/02 123/179.11 |
| 4,538,570 A * | 9/1985 | Lunt | .......................... | F02D 9/18 123/198 D |
| 4,656,987 A * | 4/1987 | Arpaia | .................... | F02M 69/24 123/463 |
| 6,585,235 B2 * | 7/2003 | Pattullo | ..................... | F02M 9/08 261/44.8 |
| 6,834,637 B1 * | 12/2004 | Sharpton | .................... | F02D 9/02 123/337 |
| 7,255,331 B2 * | 8/2007 | Grant | ..................... | F02D 9/1055 261/23.2 |
| 7,290,757 B2 * | 11/2007 | Horikawa | ................ | F02M 9/08 261/44.6 |
| 8,231,110 B2 * | 7/2012 | Stoner | ....................... | F02M 5/08 137/43 |
| 9,303,578 B2 * | 4/2016 | Wittkopf | .................. | F02D 41/08 |
| 2007/0060492 A1 * | 3/2007 | Bowsman | ............... | C10L 1/143 510/185 |

* cited by examiner

*Primary Examiner* — Michael C Zarroli

(57) ABSTRACT

An external idle air bypass for carbureted engines having a threaded housing containing a ball valve, which mounts to the outside of the carburetor at a passage which admits air to the intake plenum beneath the carburetor's throttle blades. The threaded housing may be made of metal or other materials. The ball valve may be made from brass and steel, though other materials can be used. A handle is used to operate the ball valve and is retained by a threaded nut. An air cleaner may be attached to the valve housing. Opening and closing the ball valve permits a precisely metered amount of air to enter the engine at idle, enabling the mechanic to vary the amount and air/fuel ratio of the engine without disturbing the throttle blades.

5 Claims, 7 Drawing Sheets

US 10,605,205 B1

EXTERNAL IDLE AIR BYPASS FOR CARBURETED ENGINES

DESCRIPTION OF THE RELATED ART

Although replaced in currently produced cars by fuel injection, carburetors remain in widespread use in vehicles manufactured before the 1990s and are popular with people who restore and modify older autos because they are more authentic to the era, and cost a fraction of the expense of adding fuel injection. Since carburetors are today sold in much smaller numbers than they were when nearly all cars came with one, carburetors are no longer manufactured for each specific car and engine combination. They are accordingly designed for the average engine and are available in many fewer specific models than was formerly the case. This puts a premium on the ability of a carburetor to be tuned by the end user to their specific car, engine and driving needs. Moreover, many of the owners who restore an older performance car or build their own hot rod modify their engines for additional power. These modifications include features such as camshafts with longer valve timing, increasing the cylinder and piston diameter or the stroke of the crankshaft for additional swept volume, or high-flow cylinder heads, which often cause the engine to need more air at idle. Providing that air is a challenge because of the way in which a carburetor functions.

As depicted in FIG. 10, modern carburetors, whether having one, two or four throttle bores 48, use a throttle blade 43, 44 at the bottom of a modified cylinder to control the flow of air into the engine and have several fuel circuits to provide fuel. The throttle blades 43, 44 rotate open and shut to admit more or less air, enabling thereby control of the engine's operating rpm and power output. When the engine is operating, the restriction of the throttle blades to incoming air creates negative pressure inside the intake manifold to which the carburetor is mounted. This low pressure is referred to as intake manifold vacuum. The throttle bore constricts as the air moves towards the throttle blades, forcing the air to move faster and the air's pressure to drop (per the Venturi principle). Low air pressure in the throttle bore causes fuel to flow from the fuel bowl into the air stream, creating the mixture of fuel and air on which an Otto cycle internal combustion engine runs.

Carburetors in common use employ at least three means to deliver this fuel. Again with reference to FIG. 10 the first is an idle circuit, which delivers fuel through an idle fuel channel 46 to idle ports 41 located below the primary throttle blades 43. Idle mixture screws 40 control the amount of fuel which flows through the idle ports 41. The second is a transfer slot 42 located in the throttle bore just above the throttles blades 44 when they are closed, and the third is the main circuit, which delivers fuel into a primary venturi 45 located significantly above the throttle blades 43. By design, as the throttle blades open, the low pressure area in the throttle bore is centered on each of these orifices in turn, first the idle ports 41, then the transfer slots 42, then the primary venturi 45, enabling the carburetor to deliver progressively more fuel and air as the engine needs it.

At idle, the carburetor's throttle blades are almost entirely closed. The small amount of fuel needed by the engine at idle is provided by the idle ports 42, which are exposed to intake manifold vacuum when the throttle blade 43 is in idle position. Air needed by the engine at idle comes around the throttle blades 43, which are open a small amount at idle. At idle, the transfer slots located at the throttle blades 43 and the primary venturi 45 above the throttle blades are exposed to atmospheric pressure and accordingly flow no fuel at idle.

As engine speed increases, such as when pulling away from a stop in ordinary driving, the throttle valves open to provide the additional air needed. Once operating faster than at idle, however, the idle ports 41 can no longer flow enough fuel to meet the engine's needs. The transfer slots 42 provide this additional fuel. As the throttle blades rotate open, they expose the transfer slots 42 first to intake manifold vacuum and then to high speed, low pressure air as the air flows through the small gap between the mostly closed throttle blades and the throttle bore. This low pressure draws fuel out of the transfer slots 42 to first augment the fuel flowing from the idle ports 41, then to replace it as the throttles open further and the idle ports 41 stop delivering fuel. The transfer slots are said to "bridge the gap" between fuel delivery by the idle ports and the main circuit because the main circuit does not begin to deliver fuel until the throttle blades are open further still. The main circuit generally starts delivering fuel above 30% throttle opening, as road speeds approach 40 mph. The transfer slots 42 will continue to deliver fuel at higher road speeds up to and including highway speeds, however, if the car is cruising with very little throttle and high intake manifold vacuum.

Because the transfer slots play a role in transitioning from idle to pulling away from a stop, in low-speed driving, and in high speed, low-throttle cruising, getting the relationship between the throttle blades and the transfer slots correct is a foundational step in tuning the carburetor. The standard procedure is to "square the slots"; that is, to have a length of transfer slot visible below the closed throttle blades which is equal to the slot's width. This relationship enables the transfer slot to start flowing an appreciable amount of fuel as soon as the throttle comes up from the idle position, which is exactly what it is supposed to do. Automobile manufacturers with their economies of scale could experiment to determine the precise transfer slot width and height, and relationship of the lower edge of the transfer slot and the closed throttle blades at idle which optimized operation of the original equipment carburetor at idle, low-speed and high-speed operation. The transfer slots and throttle settings at idle, as well as internal fuel metering passages, jet sizes, air bypass sizes and throttle bore sizes were all tailored to suit the specific combination. This resulted in OEM carburetors having dozens of model numbers, each specifically built to an exact combination of car, engine, transmission, and in some cases even the presence or absence of air conditioning.

On conventional carburetors, this air is provided by rotating the primary throttle valves 43 more open with an idle set screw. Turning the idle set screw up until the engine gets the air it needs at idle can, on a modified engine, open the throttle blades too far at idle, exposing a significant portion of the transfer slot to intake manifold vacuum. Exposing too much of the transfer slot to intake manifold vacuum at idle has two negative impacts. First, the transfer slot can provide so much fuel at idle one can no longer adjust the fuel/air ratio using the idle mixture screws 40, causing the engine to run too rich. This fouls spark plugs, wastes fuel and increases tailpipe emissions. Secondly, exposing the transfer slot 42 at idle can throw off the synchronization between the transfer slots, the throttle blades and the main circuit. If the throttle blade 43 is too far opened at idle, opening it further to gently accelerate from a stop or to cruise at a low speed—typically 20 or 40 mph—can cause the transfer slots to stop delivering fuel before the primary venturi 45 has enough pressure drop to initiate the flow of fuel. This causes the engine to run lean and lose power, perceived by the driver as a stumble or a flat spot in acceleration. Having the geometry between the transfer slots and throttle blades wrong can even cause the engine to run rich at high speed cruise on the highway. There is accordingly a need to be able to manage an engine's air and fuel needs at idle without turning up the idle speed screw until too much transfer slot gets exposed.

Carburetor manufacturers and mechanics have devised three methods to permit adjusting air and fuel at idle for modified engines without excessively opening the primary throttle blades 43, FIG. 10. All three current methods operate inside the carburetor itself. These are:

d) Drilling holes in the throttle blades to permit air to pass through them at idle. Some modern carburetors intended for high-performance engines come with these holes from the manufacturer. Developed by early hot rodders, this method has the virtue of being inexpensive but is a one-way path; make the holes too big, and you need to replace the throttle blades and start over. Drilling holes in the throttle blades means removing the carburetor from the engine to drill the holes then replacing it on the engine, often needing a new gasket, and also needs much experimentation to get right. The throttle blades are precision parts not designed to be readily removed and replaced; damaged throttle shafts and misaligned throttle blades can result. Moreover, additional modifications to the engine may later change the needed amount of idle bypass air, triggering a new round of carburetor removal, drilling and experimentation with the risk of having to replace the throttle blades again. This method, which requires modifying carburetor parts and consuming gaskets, is accordingly difficult to dial in to the end user's specific configuration.

e) Adding an idle circuit with idle mixture screws and an idle speed screw, but no transfer slots, to the secondary throttle bores. This is the method used by "four corner idle" Holley™ carburetors. On them, one sets the primary throttle blades 43 to the correct transfer slot relationship and then tunes in the engine's idle speed using the secondary idle speed screw which rotates the secondary throttle blades 43 open, while adjusting the air/fuel ratio by setting mixture screws 40 on all four throttle bores. This method has to be engineered into the carburetor from the factory, and is found on carburetors intended for high performance and race engines. It also adds significant cost and complexity to a carburetor.

f) Building an internal idle air bypass into the carburetor which takes air from the top of the throttle bores, meters the air using an adjustable valve mounted to the carburetor base plate, and permits the air to be pulled into the intake manifold below the throttle blades. This is a patented innovation of the Barry Grant company (U.S. Pat. No. 7,255,361). Arguably less complex than the Holley "four corner idle" design, this method still adds cost and complexity to a carburetor and has to be engineered into the carburetor from the factory.

Each of these methods has a drawback. The Holley four-corner idle and Barry Grant internal idle air bypass screw both have to be manufactured into the carburetor at the factory, and are found on top-dollar models which are outside the budget of many hobbyists. These racing carburetors are also not suitable for all engines. Drilling the throttle blades is irreversible, takes substantial experimentation to get right and risks having to replace the throttle blades if one drills the holes too large, or damages the blades during removal and replacement.

BRIEF SUMMARY OF THE INVENTION

An external idle air bypass for supplying air to carbureted internal combustion engines. The apparatus consists of a housing which attaches to the carburetor, or to a carburetor spacer, or to the intake manifold, which contains an adjustable metering valve for air. The housing is attached so as to communicate with the intake plenum below the throttle blades. Air is drawn by intake manifold vacuum into the end of the housing furthest from its attachment point, through the metering valve, and into the plenum below the throttle body. Adjusting the metering valve enables the user to precisely tune the amount of air entering the engine at idle without disturbing the relationship between the throttle blades and the transfer slot.

Advantages

The valve can be adjusted to admit a precise amount of air into the intake underneath the throttle blades. The external idle air bypass may instead be attached to a carburetor spacer, or into the intake manifold plenum. Being external to the carburetor, it can be added to an existing engine. Once installed, the external idle air bypass adds the ability to provide additional air to an idling engine without disturbing the positioning of the throttle blades with respect to the transfer slots to a carburetor which did not previously have that capability. By adjusting the metering valve, the mechanic can control the amount of air which bypasses the throttle valves at idle. By adjusting both the bypass air valve and the idle fuel/air emulsion admitted to the engine through the carburetor's idle mixture screws, the mechanic can set the desired idle speed and air/fuel ratio without disturbing the primary throttle valve. The mechanic accordingly gains the ability to use any suitable carburetor on an engine which, due to modifications for additional power, needs additional air at idle, instead of having to drill holes in the throttle blades or purchase a more expensive carburetor with an internal idle air bypass built in.

BRIEF DESCRIPTION OF THE SEVERAL VIEW OF THE DRAWINGS

Figure 1:
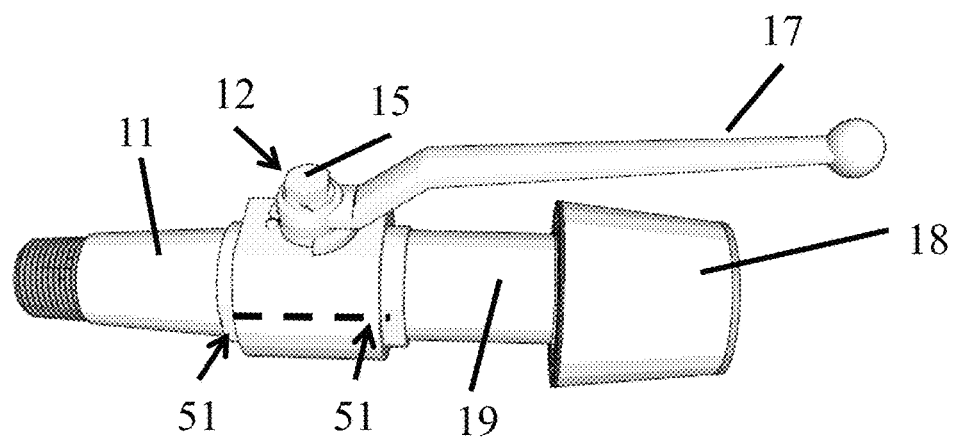
FIG. 1 is a left-side perspective of the external idle air bypass for constructed in accordance with the first embodiment.
Figure 3A:
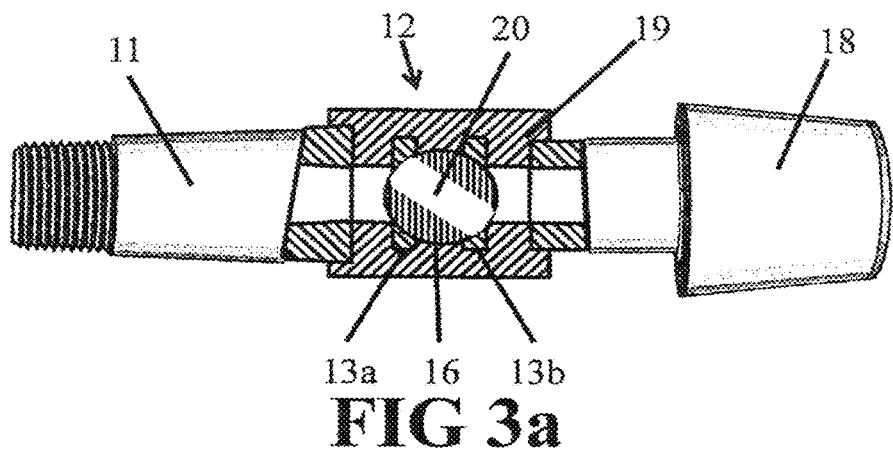

FIG. 3*a* is a dorsal cross-section of the external idle air bypass for carburetors of FIG. 1.

Figure 3B:
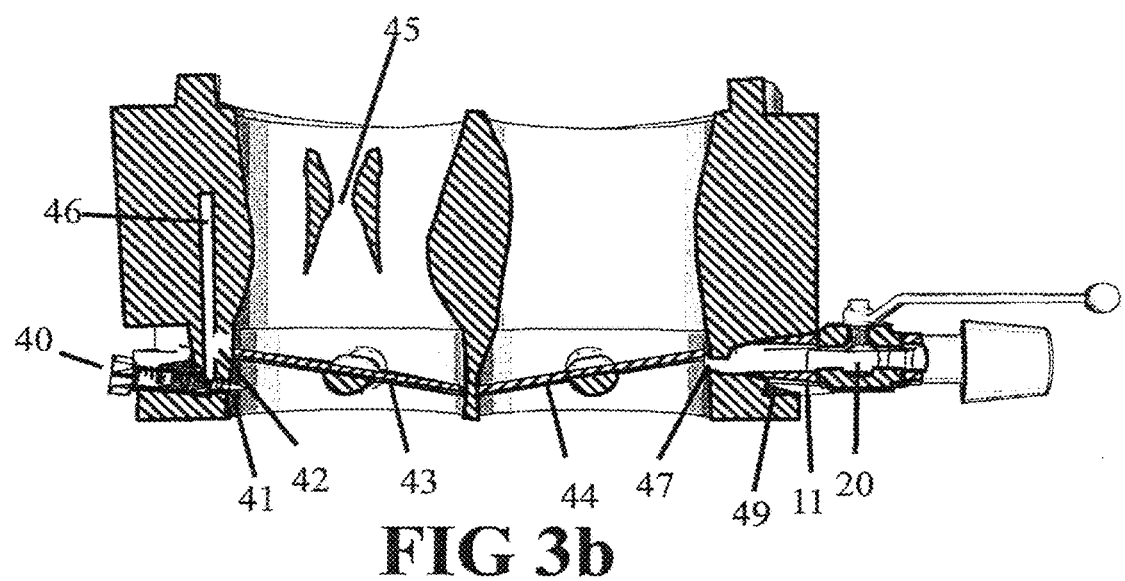

FIG. 3*b* is a lateral cross section of a generic four-barrel carburetor with the external idle air bypass added.

Figure 4:
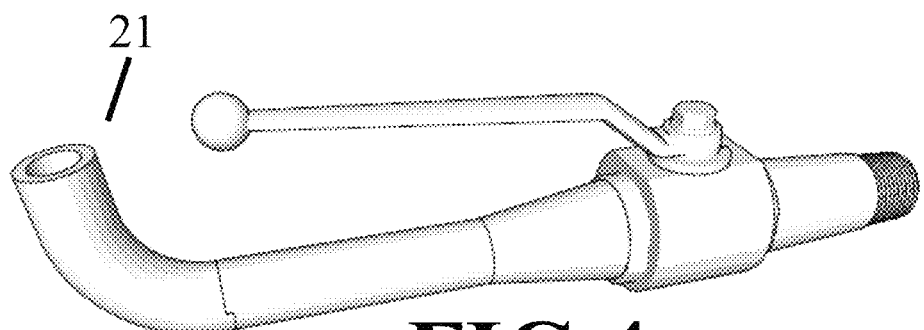

FIG. 4 is a right-side perspective of an alternate embodiment of the external idle air bypass which uses the carburetor's existing air cleaner as its source for filtered air.

Figure 5:
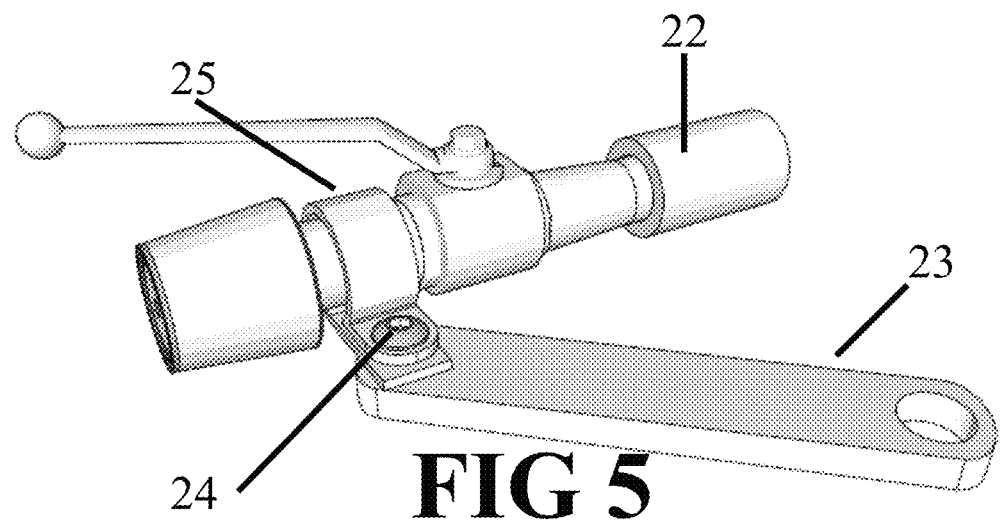

FIG. 5 is a right-side perspective of an alternate embodiment of the external idle air bypass for carburetors with a vacuum nipple instead of a threaded passage to which the external idle air bypass for carburetors can mount.

Figure 6:
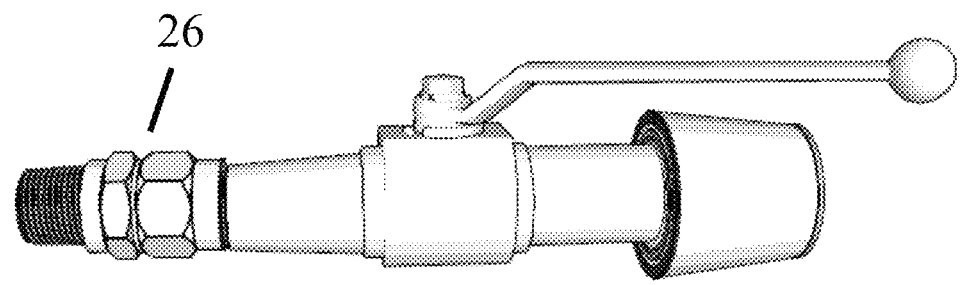

FIG. 6 is a left-side perspective of an alternate embodiment of the of the external idle air bypass with an AN fitting to permit clocking the valve stem as desired.

Figure 7:
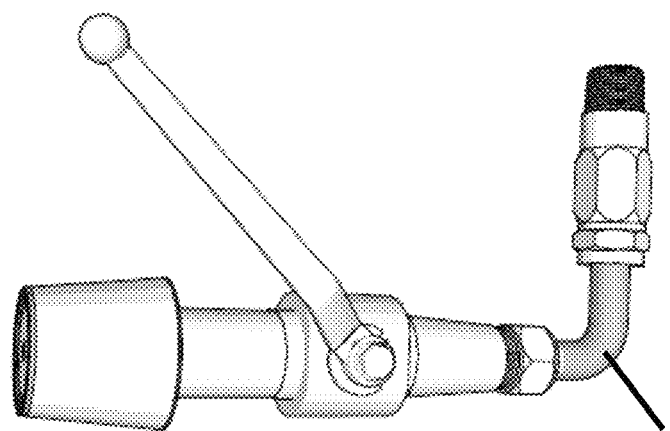

FIG. 7 is a top-side perspective of an alternate embodiment of the external idle air bypass with an angled AN fitting to permit avoiding obstacles in tight applications.

Figure 8A:
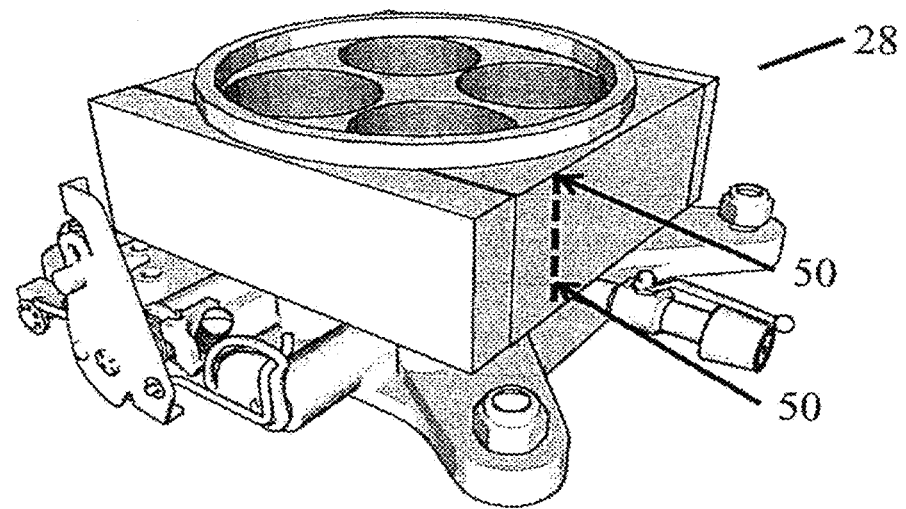

FIG. 8a is a left rear perspective of the external idle air bypass of FIG. 1 mounted to a carburetor for operation.

Figure 8B:
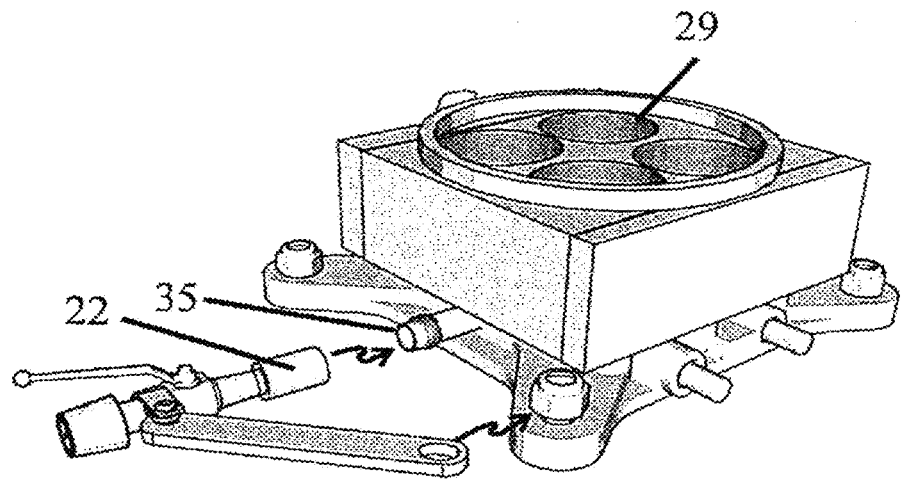

FIG. 8b is a right rear perspective of the external idle air bypass for carburetors of FIG. 5 mounted to a carburetor for operation.

Figure 8C:
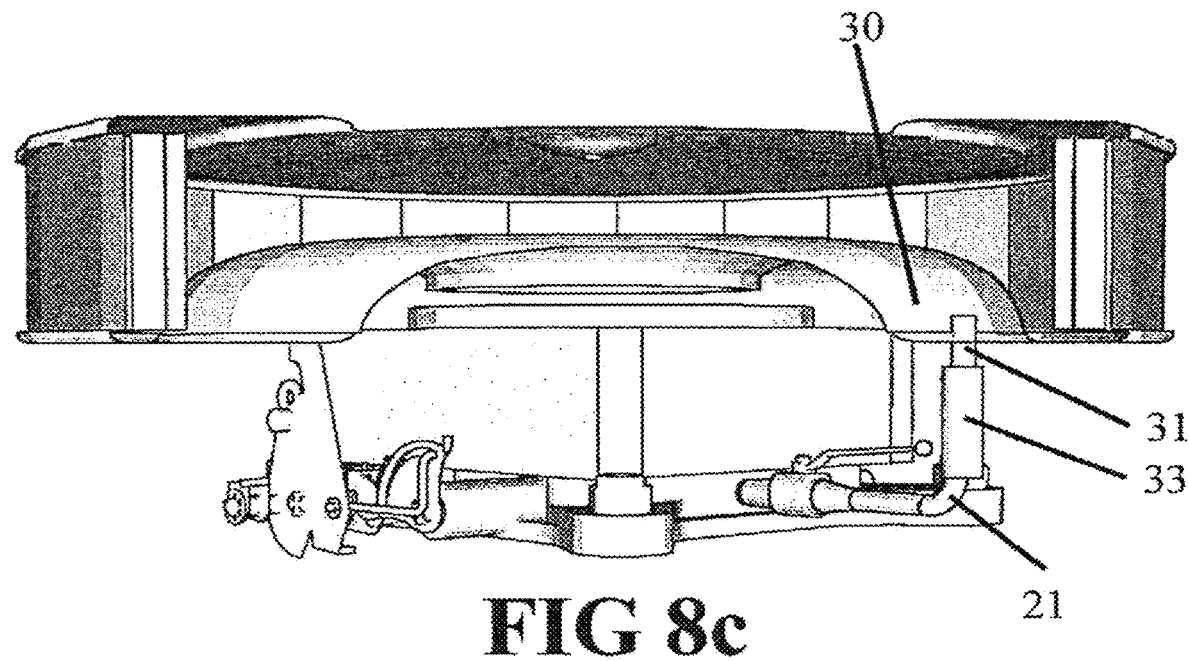

FIG. 8c is a left rear perspective and partial cross-section of the air cleaner showing the external idle air bypass for carburetors of FIG. 4 mounted to a carburetor for operation.

Figure 8D:
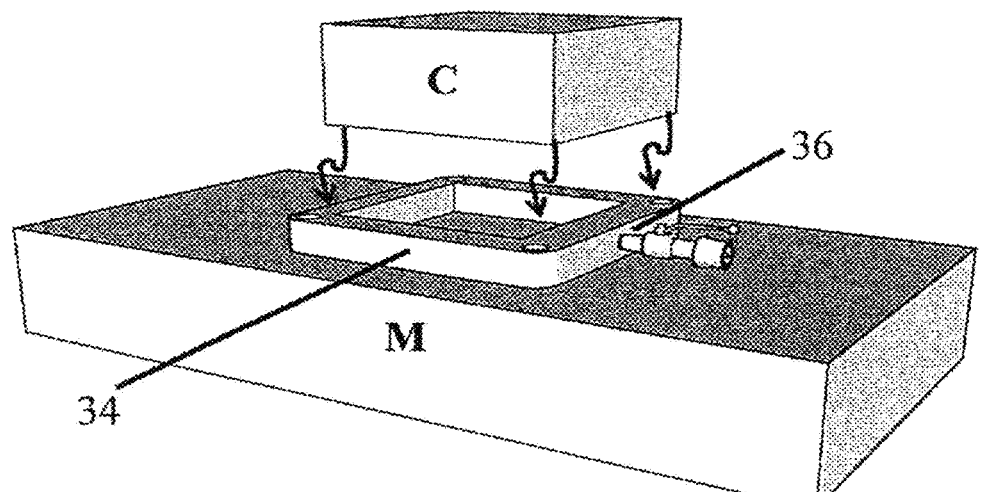

FIG. 8d is a left rear perspective of the external idle air bypass of FIG. 1 mounted to a carburetor spacer for installation between a carburetor and an intake manifold.

Figure 9:
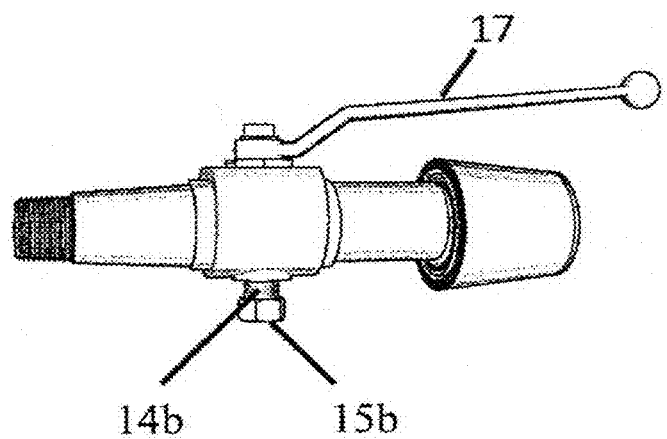

FIG. 9 is a left-side perspective of an alternate embodiment of the external idle air bypass with a two-stemmed ball valve.

Figure 10:
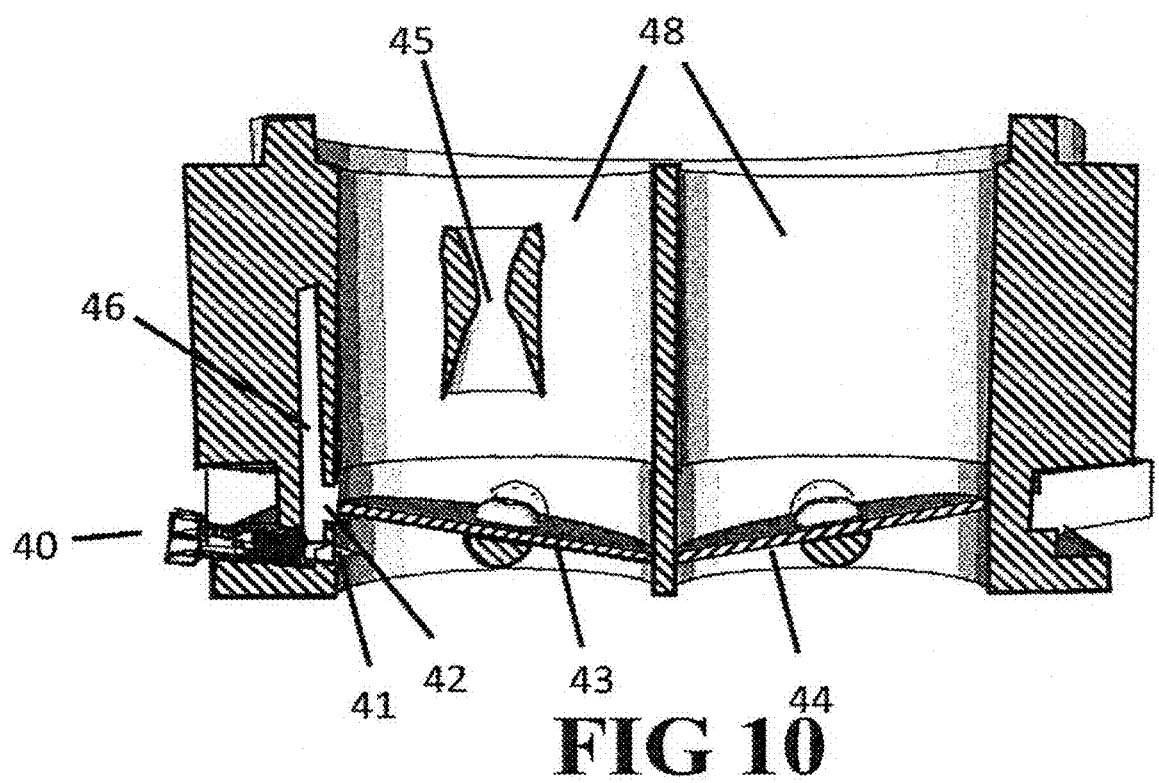

FIG. 10 is a cross-section of a generic four-barrel carburetor to illustrate prior art and depict the operation of the first embodiment.

DRAWINGS—REFERENCE NUMERALS 11 threaded housing
12 ball valve
13a ball valve seat
13b ball valve seat
14a valve stem
14b valve stem
15a valve handle nut
15b valve handle nut
16 ball
17 handle
18 air cleaner
19 valve housing
20 valve opening
21 curved housing
22 flexible hose
23 bracket
24 screw
25 clamp
26 swivel fitting
27 angled fitting
28 Edelbrock PERFORMER™ or THUNDER™ Carburetor
29 carburetor with hose nipple vacuum port
30 air cleaner base
31 air cleaner hose nipple
32 forward housing
33 flexible hose
34 carburetor spacer
35 vacuum port hose nipple
36 threaded hole
40 idle mixture screw
41 idle port
42 transfer slot
43 primary throttle blade
44 secondary throttle blade
45 primary venturi
46 idle fuel channel
47 air passage in baseplate
48 throttle bores
49 ¼ NPT threaded hole
50 cross section line for FIGS. 3b and 10
51 cross section line for FIG. 3a

DETAILED DESCRIPTION OF THE INVENTION

FIGS. 1-3b—First Embodiment

FIG. 1 is a perspective view taken from the left side of an external idle air bypass for carburetors constructed in accordance with the embodiment. A threaded housing 11 attaches the idle air bypass to the carburetor. The threaded housing may be made of metal or other materials. A ball valve 12 attaches to the threaded housing 11; ball valve 12 may be made from brass and steel, though other materials can be used. A different form of valve, such as a butterfly valve or gate valve, may also be used in place of ball valve 12. A replaceable metered orifice such as a carburetor jet could also be used in place of ball valve 12. A handle 17 is used to operate the ball valve 12 and is retained by a threaded nut 15a. An air cleaner 18 may be attached to the valve housing 19 by press fit, retaining screws or other means. Air cleaner 18 may be made from steel and loosely-woven cotton mesh although other materials such as aluminum, expanded foam and etc. can be used.

Figure 2:
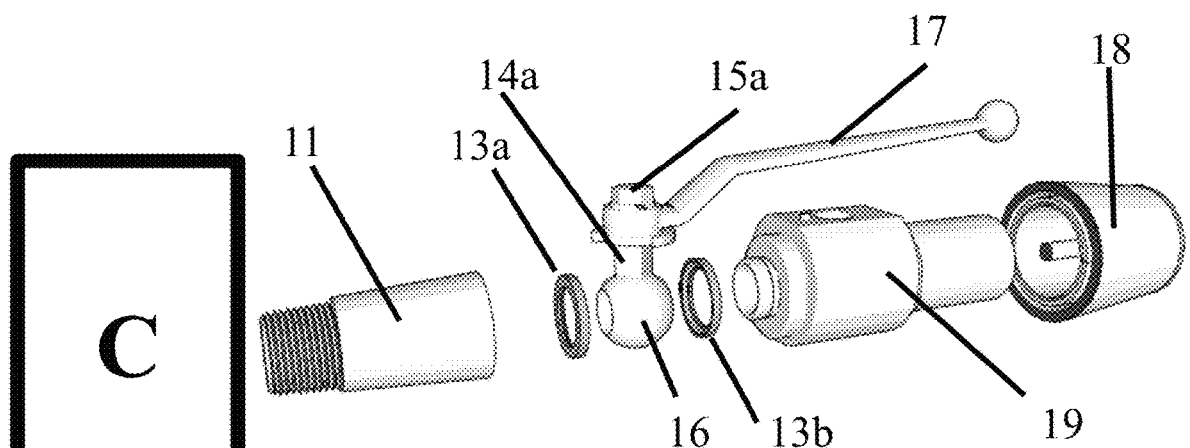
FIG. 2 is an exploded, left-side perspective view of the external idle air bypass for carburetors depicted in FIG. 1.

FIG. 2 is an exploded perspective view taken from the left side showing the sequence of parts used in the embodiment of FIG. 1. Threaded housing 11 screws into a threaded vacuum port 49 on the rear of carburetors such as the Edelbrock PERFORMER™ carburetor and THUNDER™ carburetor models, the carburetor indicated by C in the figure. The other end of the threaded housing 11 inserts into a valve housing 19 which contains the components of a ball valve 12: two valve seats 13a and 13b which provide an air-tight seal; a valve stem 14a rigidly attached to a ball 16; a threaded handle retaining nut 15 attached by threads to the valve stem 14a; and a handle 17 to permit rotating the valve stem 14a and ball 16. The handle 17 is retained on the valve stem 14a by the handle retaining nut 15a such that rotating the handle urges the valve stem 15 and ball 16 to rotate. An air cleaner 18 may be attached to the valve housing 19 by press fit, retaining screws or other means. The air cleaner may be made from steel and loosely-woven cotton mesh although other materials such as aluminum, polycarbonate and etc can be used. Although the ball valve housings 11 and 19 are generally circular in cross-section in this embodiment, they may be another shape in cross-section such as hexagonal or square.

FIG. 3a is a horizontal cross-section of the embodiment of FIG. 1, the cross section being taken along line 51 in FIG. 1. The ball 16 is seen between the valve seats 13a and 13b contained within the valve housing 19. The threaded housing 11 may be retained inside the valve housing 19 by press fit, threads or other means which enable threaded housing 11 to retain ball 16 and seats 13a and 13b inside housing 19. Air cleaner 18 is attached to the end of housing 19 on the end opposite the carburetor. Ball 16 is depicted partially open; a valve opening 20 in ball 16 is partially obstructed by valve housing 19 and valve seats 13a and 13b.

FIG. 3b is a vertical cross-section of the carburetor depicted in FIG. 8a, the cross section being taken along line 50 in FIG. 8a, which shows the function of the embodiment of FIG. 1 when mounted to the carburetor. The carburetor has a multiplicity of throttle bores 48; the primary throttle bore contains a primary venture 45, and an idle fuel channel 46 which provides fuel to a transfer slot 42 and an idle port 41. Fuel flow into the idle port 41 is metered by idle mixture screw 40. The figure depicts the spatial relationship of the primary throttle blade 43, the idle port 41 and the transfer slot 42 within the primary throttle bore. The carburetor also has a threaded hole 49 communicating with an air passage in the baseplate 47; the figure depicts the spatial relationship between the air passage 47 and the secondary throttle blade 44.

Operation—FIGS. 1, 2, 3a, 3b, 8a

The Edelbrock PERFORMER™ and THUNDER™ series carburetors have a ¼ National Pipe Thread threaded hole 49 at the back intended as a vacuum source for power brakes. This hole communicates with a passage 47 leading into the intake plenum below the throttle blades 44, which makes it ideal for mounting the external idle air bypass, FIG. 3b. The threaded housing is installed in this threaded hole using pipe sealant or PTFE tape to ensure an airtight seal, with valve housing 19 positioned such that handle 17 can turn through 90 degrees, to permit adjusting the external idle air bypass, FIGS. 2 and 8a.

Once attached, the external idle air bypass should connect to a source of clean, filtered air. Air filter 18 is that air source in this embodiment, FIG. 3a. Air is drawn into the external idle air bypass by low pressure underneath the throttle blades at idle, FIG. 3b. This air moves from air cleaner 18 inside valve housing 19 to ball valve 12, then moves through the air passage 20 inside the ball 16, FIG. 3a. By opening or closing ball valve 12, the mechanic increases or decreases the effective size of valve opening 20, permitting more or less air to pass through the valve. Referring to FIG. 3b, once past valve opening 20 the air moves along threaded housing 11 to enter the carburetor's rear vacuum port 49, which guides the air to enter the rear throttle bores underneath secondary throttle blades 44 at an air passage 47.

To use the external idle air bypass, the mechanic adjusts the carburetor's existing idle speed set screw such that a minimal amount of the transfer slot 42 is visible beneath the closed throttle blades, FIG. 3b. For most carburetors one "squares the slots", which means adjusting the throttle blades with the carburetor off the engine so that the portion of the transfer slot visible below the throttle blades at idle appears square. Squaring the slots establishes the correct relationship and timing between the primary throttle blades 43 and the transfer slots 42. With the engine running at idle, the mechanic then adjusts the amount of air entering the engine by turning the valve stem 14a with the handle 17 or a wrench, FIG. 1. Opening the valve will admit more air, increasing idle speed until the air/fuel mixture becomes too lean. The mechanic then turns the carburetor's existing idle mixture screws 40 to adjust the air/fuel ratio, FIG. 3b. Contra wise, closing the valve will admit less air, decreasing idle speed and making the air/fuel ratio richer. The mechanic will then turn the idle mixture screws 40 to lean out the air/fuel ratio, FIG. 3b. This is an iterative process since airflow and fuel mixture both impact idle speed and quality. The mechanic adjusts the amount of air using the external idle air bypass and the amount of fuel using the idle mixture screws 40 until he or she attains the desired idle speed and idle air/fuel mixture, FIG. 3b. He or she then conduct a road test to confirm operation of the carburetor throughout idle, off-idle and transition to the main circuit. As with any tuning effort on a carbureted engine, this is an iterative process in which the advantages of being able to precisely control idle air without disturbing the throttle blades becomes manifest.

FIGS. 4-7—Alternate Embodiments

FIG. 4 is a right-side perspective view of an embodiment of the external idle air bypass for carburetors intended to use the carburetor's existing air cleaner as the source of filtered air.

Air cleaner 18 is not present in this embodiment it is replaced with a curved housing 21 which may be made of brass or other rigid materials. The curved housing is long enough to avoid interfering with the operation of handle 17. The existing air cleaner is modified by the addition of a hose nipple 31 in the air cleaner base 30 oriented towards the open end of curved housing 21, FIG. 8c. A flexible hose 33 of suitable length and diameter connects curved housing 21 to hose nipple 31. This hose may be made from artificial rubber or some other flexible material suitable for automobile vacuum hose.

This embodiment installs on the carburetor in the same manner as the first embodiment with the exception of connecting flexible hose 33 to the air cleaner. Once installed, operation is the same as that of the embodiment of FIG. 1. Using the existing air cleaner reduces cost and may be more attractive aesthetically on some installations.

FIG. 5 is right-side perspective view of an embodiment for carburetors which have a vacuum nipple instead of a threaded hole available to mount the external idle air bypass. This includes such carburetors as the Carter AFB™ and AVS™, and many Holley and Rochester QUADRAJET™ carburetors. In this embodiment, threaded housing 11 is replaced by a forward housing 32 having a hose nipple on the end. A flexible hose 22 connects forward housing 32 to the carburetor's vacuum port hose nipple 35, FIG. 8b. Because hose 22 is not rigid and cannot hold the external idle air bypass in position, a bracket 23, screw 24 and clamp 25 provide a rigid mounting. Forward housing 32, mounting bracket 23, screw 24 and clamp 25 may be made of brass, aluminum, carbon fiber or other materials. Other means of rigidly mounting the external idle air bypass may also be used. Hose 22 may be made from artificial rubber or some other flexible material suitable for automobile vacuum hose. Once installed, this embodiment is operated in the same way as the embodiment of FIG. 1.

FIG. 8b is a right-rear perspective of this embodiment installed on a carburetor 29. Mounting bracket 23 is secured to the right rear carburetor stud with a threaded nut. Valve housing 19 is secured by clamp 25 to mounting bracket 23 using screw 24. Forward housing 33 is connected to the carburetor's rear pipe nipple by hose 22. Once mounted, this embodiment is operated in the same way as the embodiment of FIG. 1.

FIG. 6 is a left-side perspective of an embodiment which permits clocking valve stem 14a and handle 17 for ease of access on the engine. It overcomes a circumstance in which the external idle air bypass, once threaded into the carburetor as in FIG. 8a, is oriented with the valve stem facing towards or interfering with the intake manifold or another obstruction. In this embodiment, forward housing 11 is threaded into a swiveling AN fitting 26 which is itself threaded into the carburetor, FIG. 6. The AN fitting 26 swivels so that the operator can clock, or orient, valve stem 14a and handle 17 as desired. Once installed, this embodiment is operated in the same way as the embodiment of FIG. 1.

FIG. 7 is a top down perspective view of an embodiment which changes the installed position of the external idle air bypass to avoid other components on top of the engine such as a second carburetor, or a distributor. In this embodiment forward housing 11 is threaded into an angled AN fitting 27, which is itself threaded into the carburetor. Although illustrated with a 90 degree fitting, other angles can be used to mount the external idle air bypass in an aesthetically pleasing and convenient location. Once mounted, this embodiment is operated in the same way as the embodiment of FIG. 1.

FIGS. 8-9, Alternate Embodiments

FIG. 8d is a left rear perspective view of the external idle bypass of FIG. 1 mounted to a carburetor spacer, 34. Some carburetors have no suitable vacuum passage or port available to which an external idle air bypass can conveniently mount. For those carburetors, the external idle air bypass can mount to a carburetor spacer 34 which mounts in between the carburetor, box C in the figure, and the intake manifold, box M in the figure. The carburetor spacer may be made from wood, aluminum, carbon fiber or other rigid materials, and contains a threaded hole 36 penetrating to the inside of the spacer, to which the external idle air bypass mounts. Once mounted to the spacer 34, and the spacer installed on the engine between carburetor C and intake manifold M, this embodiment is operated in the same manner as the embodiment of FIG. 1.

FIG. 9 is a left side perspective view of an embodiment which solves the clocking problem addressed in FIG. 6 in a different way. In this embodiment, the ball valve has both valve stem 14a and a second valve stem diametrically opposed to it, valve stem 14b. With two valve stems, no matter what clocking or orientation valve housing 19 is in once fully tightened into the carburetor, at least one valve stem will be clear of the intake manifold and available to operate ball valve 12. Although valve stem 14b is depicted with a threaded shaft and handle retaining nut with the intent of remounting handle 17 to it, another embodiment would omit handle 17 altogether and use a hex head or Allen head on the end of valve stem 14a or 14b so that the mechanic would adjust ball valve 12 using a wrench. Once installed, this embodiment operates in the same way as the embodiment of FIG. 1.

Additional permutations of these embodiments, such as forward housing of the FIG. 5 embodiment combined with the filtered air feed of the FIG. 4 embodiment, or the addition of a check valve in between the bal valve 12 and the threaded housing 11 to permit use on a supercharged engine which sees positive intake manifold pressure, can readily be devised.

Advantages

From the description above, several advantages of some embodiments of my external idle air bypass for carbureted engines become evident:

(f) The adjustable valve enables the user to precisely tune any suitable carburetor's idle characteristics to their modified engine, enabling a given carburetor to support a much broader range of engines.

(g) Being a separate component, the user can add it to their existing carburetor, avoiding the much greater expense of a carburetor which has the Holley four-corner idle system or the Barry Grant internal idle air bypass built into it.

(h) Although more expensive than drilling holes in the throttle blades, the external idle air bypass's adjustability allows the user to get exactly the correct amount of idle air into the engine without the laborious process of removing, modifying, and re-installing the carburetor, without consuming gaskets, and without the risk of drilling too large a hole, rending the throttle blade unusable.

(i) Adding the external air bypass may permit the user to retain an original equipment carburetor on their car despite having modified the engine, a feature of interest to many automotive hobbyists.

(j) The design of the external idle air bypass lends itself to mounting to the carburetor, or to a carburetor spacer, or directly to the intake manifold, enabling the user to optimize the appearance as well as the performance of their engine.

CONCLUSION, RAMIFICATIONS AND SCOPE

The reader will accordingly see that at least one embodiment of the external idle air bypass for carburetors enhances the mechanic's ability to use an existing carburetor on an engine needing extra air at idle. Adding an adjustable, external idle air bypass to the less expensive and more widely available carburetors manufactured without one gives them the benefits of tuning idle speed and idle air/fuel ratio without adversely impacting the relationship of the throttle valves to the idle discharge ports and the transfer slots. This matches the capability of today's premium carburetors at much reduced cost. In some cases it may permit using a restoration-correct factory carburetor on a modified engine, which is of interest to many car hobbyists.

Unlike drilling holes in the throttle blades, the external idle air bypass is adjustable and can be non-destructively tuned to meet the needs of the engine and car combination. Unlike the Holley four-corner idle system or the Barry Grant internal bypass, it can be retrofitted to an existing carburetor that would otherwise be overmatched by a modified engine. It may also permit anew equipment manufacturer to use a smaller number of carburetors to cover a wider range of engines.

The design of this embodiment offers ease of manufacture and operation. Using a ball valve provides an airtight, lightweight, commonly available metering device with optimal packaging and air flow requirements. Due to tapping into the throttle bores underneath the throttle blades, the external idle air bypass automatically reduces bypass air at throttle settings greater than idle with higher air pressure beneath the throttle blades. This avoids altering the carburetor's tuning at speeds above idle.

Although one embodiment has been disclosed in detail herein and several variations described as well, it will be obvious to those skilled in the art that additional variations and modifications of the disclosed embodiment can be made. For example, the carburetor spacer depicted in FIG. 8d could replace part or all of threaded housing 11 and valve housing 19 for a cleaner installation. Another embodiment would be to install the external idle air bypass directly to the intake manifold if the carburetor has no suitable vacuum access port, and a carburetor spacer is not desired, or to mount the external idle air bypass to an existing Positive Crankcase Ventilation hose, or to use a computer-actuated solenoid instead of a manually adjusted valve so as to have closed-loop tuning at idle. Accordingly, the scope should be determined not by the illustrated embodiments but by the following claims and their legal equivalents.

I claim:

1. An adjustable external idle air bypass for an internal combustion engine's carburetor, said carburetor having one or more throttle blades, comprising
   a. a housing attached to the outside of said carburetor such that air can enter said carburetor through said housing downstream of the carburetor's throttle blades
   b. the housing having an opening at the end most distant from the carburetor through which air enters the housing c. said housing drawing air from outside the carburetor body which has not entered the carburetor's throttle bores d. an adjustable ball valve mounted in said housing for metering the amount of air entering said carburetor whereby the amount of air entering the engine at idle can be precisely metered without moving said throttle blades.

2. An adjustable external idle air bypass for an internal combustion engine's carburetor, said carburetor having one or more throttle blades and mounted to an intake manifold, comprising a. a housing attached to a carburetor spacer mounted between a carburetor and said intake manifold b. said carburetor spacer having a passage communicating between the inside of the carburetor spacer beneath the throttle blades and air outside the carburetor spacer c. the housing having an opening at the end most distant from the carburetor spacer through which air enters the housing d. the housing drawing air from outside the carburetor's body which has not entered the carburetor's throttle bores e. an adjustable ball valve mounted in said housing for metering the amount of air entering said carburetor spacer whereby the amount of air entering the engine at idle can be precisely metered without moving the throttle blades.

3. An adjustable external idle air bypass for an internal combustion engine's carburetor, said carburetor having one or more throttle blades and mounted to an intake manifold, comprising a. a carburetor spacer mounted between said carburetor and said intake manifold, b. a passage in said carburetor spacer communicating between the inside of the carburetor spacer beneath the throttle blades and air outside the carburetor spacer c. an adjustable valve mounted in said passage in the carburetor spacer for metering the amount of air entering the intake manifold whereby the amount of air entering the engine at idle can be precisely metered without moving the throttle blades.

4. An adjustable external idle air bypass for an internal combustion engine's carburetor, said carburetor having one or more throttle blades and mounted to an intake manifold, comprising a. a housing attached to said intake manifold such that air can pass through said housing and enter the intake manifold downstream of the throttle blades b. said housing having an opening at the end most distant from the intake manifold through which air enters the housing c. said housing drawing air from outside the carburetor body which has not entered the carburetor's throttle bores d. an adjustable ball valve mounted in said housing for metering the amount of air entering the intake manifold whereby the amount of air entering said engine at idle can be precisely metered without moving the throttle blades.

5. An adjustable external idle air bypass for an internal combustion engine's carburetor, said carburetor having one or more throttle blades and mounted to an intake manifold, comprising a. a passage in the wall of said intake manifold communicating between the inside of the intake manifold beneath the throttle blades and the outside air b. an adjustable ball valve mounted in said passage in the intake manifold for metering the amount of air entering said intake manifold whereby the amount of air entering the engine at idle can be precisely metered without moving the throttle blades.

\* \* \* \* \*